(12) United States Patent
Matsushita

(10) Patent No.: US 9,821,805 B2
(45) Date of Patent: Nov. 21, 2017

(54) VEHICLE CONTROL DEVICE

(71) Applicant: TOYOTA JIDOSHA KABUSHIKI KAISHA, Toyota-shi, Aichi-ken (JP)

(72) Inventor: Koki Matsushita, Mishima (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 119 days.

(21) Appl. No.: 15/049,199

(22) Filed: Feb. 22, 2016

(65) Prior Publication Data
US 2016/0264140 A1 Sep. 15, 2016

(30) Foreign Application Priority Data

Mar. 12, 2015 (JP) ................................ 2015-049888

(51) Int. Cl.
*F02N 19/00* (2010.01)
*B60W 30/18* (2012.01)
*B60W 10/02* (2006.01)
*B60W 10/06* (2006.01)
*F02N 11/08* (2006.01)
(Continued)

(52) U.S. Cl.
CPC ............ *B60W 30/18* (2013.01); *B60W 10/02* (2013.01); *B60W 10/06* (2013.01); *F02N 11/0822* (2013.01); *F02N 19/005* (2013.01); *F02N 99/002* (2013.01); *B60W 2510/0685* (2013.01); *B60W 2510/1005* (2013.01); *B60W 2510/18* (2013.01); *B60W 2710/021* (2013.01); *B60W 2710/0644* (2013.01); *F02D 41/065* (2013.01); *F02N 11/0803* (2013.01);
(Continued)

(58) Field of Classification Search
CPC .. F02N 19/005; F02N 99/002; F02N 11/0822; B60W 2510/18; B60W 2510/1005; B60W 2510/0208; B60W 2510/0685; B60W 2710/021
See application file for complete search history.

(56) References Cited

U.S. PATENT DOCUMENTS 6,524,217 B1 * 2/2003 Murakami ............. B60K 6/365
180/65.225
9,393,954 B2 * 7/2016 Gibson .................. F02D 41/022
(Continued)

FOREIGN PATENT DOCUMENTS

DE 102008054729 A1 * 7/2010 ........... F02N 19/005
JP 2005-016356 A 1/2005
(Continued)

*Primary Examiner* — Sherry L Estremsky
(74) *Attorney, Agent, or Firm* — Sughrue Mion, PLLC

(57) ABSTRACT

A vehicle control device includes a controller configured to perform: ignition starting of an engine when a detected crank angle is within a first area in which the ignition starting of the engine may be performed with probability not smaller than a first predetermined value; and the ignition starting of the engine while increasing an engine speed by engaging a clutch to transmit torque of a drive wheel to a crankshaft when the crank angle is within a second area in which the ignition starting of the engine may be performed with probability not smaller than a second predetermined value smaller than the first predetermined value and smaller than the first predetermined value, the instruction is output based on a signal indicating that a braking unit is turned on, and a gear of a transmission is not in neutral.

2 Claims, 3 Drawing Sheets

(51) Int. Cl.
*F02N 99/00* (2010.01)
*F02D 41/06* (2006.01)

(52) U.S. Cl.
CPC ............... *F02N 2200/0802* (2013.01); *F02N 2200/102* (2013.01); *Y02T 10/48* (2013.01)

(56) References Cited

U.S. PATENT DOCUMENTS

2016/0298559 A1* 10/2016 Matsushita ......... F02N 11/0862
2017/0217438 A1* 8/2017 Iwamoto ......... B60W 30/18072
　　　　　　　　　　　　　　　　　　　　　　　701/54

FOREIGN PATENT DOCUMENTS

| JP | 2005-315229 A | 11/2005 |
| JP | 2008-133793 A | 6/2008 |
| JP | 2015-014231 A | 1/2015 |

* cited by examiner

VEHICLE CONTROL DEVICE

CROSS-REFERENCE TO RELATED APPLICATION(S)

The present application claims priority to and incorporates by reference the entire contents of Japanese Patent Application No. 2015-049888 filed in Japan on Mar. 12, 2015.

BACKGROUND OF THE DISCLOSURE

1. Field of the Disclosure

The present disclosure relates to a vehicle control device.

2. Description of the Related Art

Various methods of restarting an engine when restarting the engine stopped while a vehicle is driven are conventionally suggested. For example, Japanese Patent Application Laid-open No. 2005-16356 discloses the technology to restart by ignition starting of the engine when a stopping position of a piston of the engine is within a predetermined appropriate range and to assist the restart of the engine by driving a starter motor when this is outside the predetermined appropriate range.

However, when the engine is frequently stopped and restarted during travel, the number of times to restart the engine by driving the starting device such as the starter motor increases and usage frequency of the starting device increases. When the usage frequency of the starting device increases, a load on the starting device increases and a lifetime of the starting device might be short.

Therefore, as a method of restarting without using the starting device, there is a method so-called push starting to start injection of fuel and ignition while increasing a speed of the engine by transmitting torque of a drive wheel to a crankshaft of the engine. However, in the restarting method using the push starting, decelerating acceleration (deceleration G) occurs on the vehicle, so that a driver might feel uncomfortable, and drivability might be deteriorated.

SUMMARY OF THE DISCLOSURE

It is an object of the present disclosure to at least partially solve the problems in the conventional technology.

A vehicle control device according to the disclosure is adapted for controlling a vehicle including : an engine; a starting device capable of starting the engine; a clutch which connects or blocks a power transmission path between the engine and a drive wheel by being engaged or disengaged; a transmission capable of outputting driving force input from the engine after changing a speed; a crank angle measuring unit which detects a crank angle on a crankshaft of the engine when the engine stops; and a braking unit which puts a brake on the vehicle, wherein the vehicle is configured to continuously travel in a state in which the clutch is disengaged and the engine is stopped. The vehicle control device includes a controller to which the crank angle detected by the crank angle measuring unit is input when an instruction to restart the engine is input during travel with the clutch disengaged and the engine stopped. The controller is configured to perform: ignition starting of the engine when the crank angle is within a first area in which the ignition starting of the engine may be performed with probability not smaller than a first predetermined value; and the ignition starting of the engine while increasing an engine speed by engaging the clutch to transmit torque of the drive wheel to the crankshaft when the crank angle is within a second area in which the ignition starting of the engine may be performed with probability not smaller than a second predetermined value smaller than the first predetermined value and smaller than the first predetermined value, the instruction is output based on a signal indicating that the braking unit is turned on, and a gear of the transmission is not in neutral.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION OF THE PREFERRED EMBODIMENTS

One embodiment of the present disclosure is hereinafter described with reference to the drawings. Meanwhile, the same reference sign is assigned to the same or corresponding parts in all the drawings of one embodiment below. The present disclosure is not limited by one embodiment described below.

Figure 1:
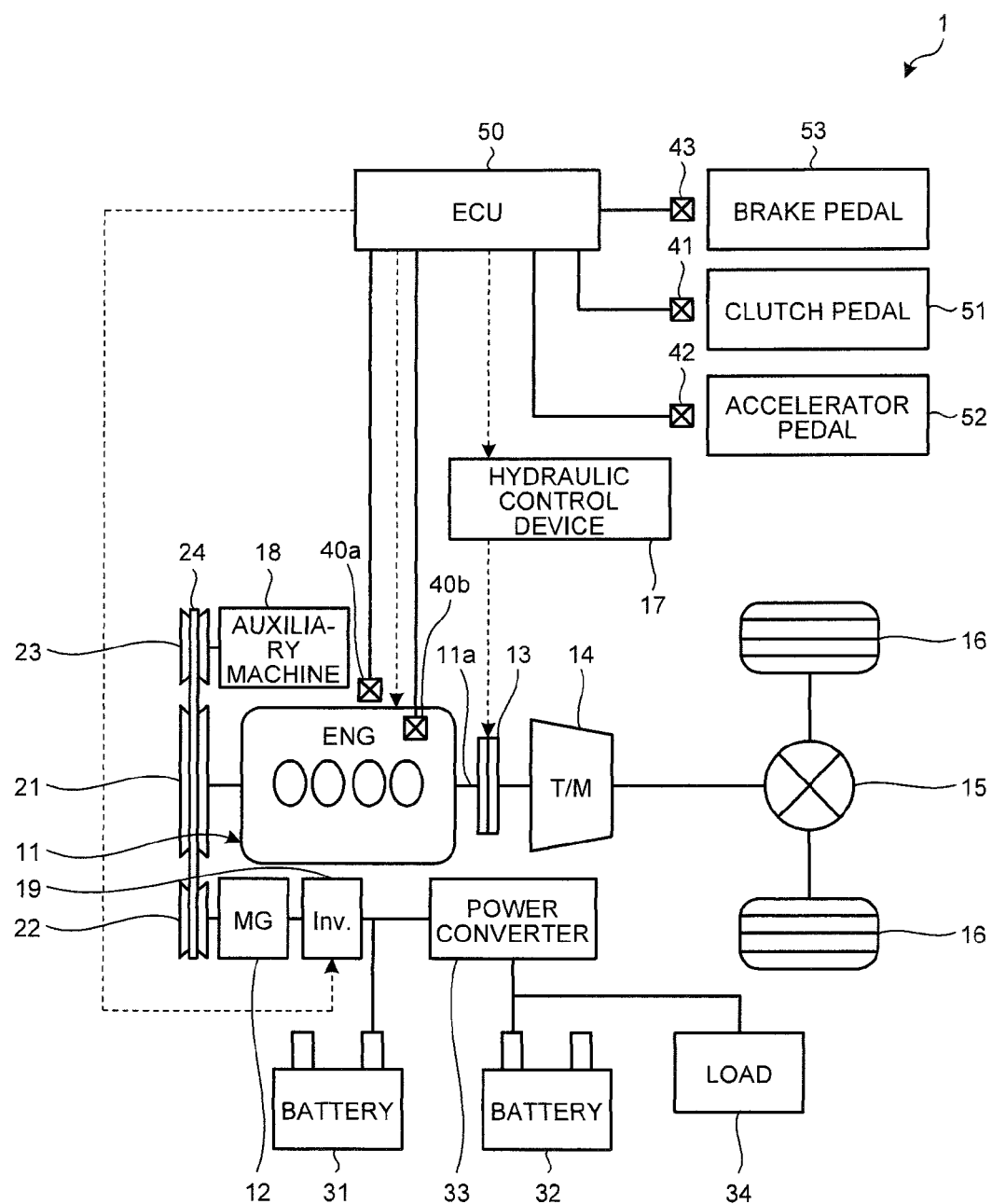
FIG. 1 is a schematic configuration diagram of a vehicle on which a vehicle control device according to one embodiment of the present disclosure is mounted.

FIG. 1 is a schematic configuration diagram illustrating a vehicle on which a vehicle control device according to one embodiment is mounted. A vehicle 1 illustrated in FIG. 1 is a one motor-type hybrid vehicle, for example. The vehicle 1 includes an engine (ENG) 11, a motor/generator (MG) 12, a clutch 13, a stepped transmission (T/M) 14, a differential gear 15, and right and left drive wheels 16. The vehicle 1 includes a hydraulic control device 17, an auxiliary machine 18, an inverter 19, pulleys 21, 22, and 23, a transmission belt 24 stretched around the pulleys 21, 22, and 23, a high-voltage battery 31, a battery 32, a power converter 33, and a load 34. The vehicle 1 is further provided with a clutch pedal 51, an accelerator pedal 52, and a brake pedal 53, and includes a clutch pedal sensor 41, an accelerator pedal sensor 42, and a brake pedal sensor 43 which detect operational amounts of the pedals, respectively. The engine 11 includes an engine speed sensor 40*a* and a crank angle sensor 40*b*. The engine speed sensor 40*a* measures a speed of the engine 11. The crank angle sensor 40*b* measures a crank angle of the engine 11.

The vehicle 1 includes an ECU (electronic control unit) 50 which is a processor or a controller as the vehicle control device. The ECU 50 is electrically connected to the engine speed sensor 40*a*, the crank angle sensor 40*b*, the clutch pedal sensor 41, the accelerator pedal sensor 42, and the brake pedal sensor 43. The ECU 50 at least controls the engine 11, the hydraulic control device 17, and the inverter 19.

The engine 11 is formed of a direct-injection engine as a power source of the vehicle 1 and one end of an output shaft 11*a* of which is connected to the stepped transmission 14 through the clutch 13. The engine 11 is configured to be able to start without using a starting device, that is to say, to perform ignition starting by using torque obtained from combustion of fuel in the engine 11. Output torque (engine torque) of the engine 11 is output from the output shaft 11*a* through a crankshaft (not illustrated). The engine torque output to the output shaft 11*a* is input to the stepped transmission 14 through the clutch 13 to be transmitted to the drive wheel 16 through the differential gear 15. In contrast, the pulley 21 is connected to the other end of the output shaft 11*a*.

The MG 12 as the starting device is formed of a permanent magnet-type AC synchronous electric motor, for example. The pulley 22 is provided on a rotary shaft of the MG 12 so as to be integrally rotatable with the same. The rotary shaft of the MG 12 and the output shaft 11*a* of the engine 11 are connected to each other through the pulleys 21 and 22 and the transmission belt 24. According to this, motor torque of the MG 12 is imparted to the output shaft 11*a*. The MG 12 operates as a power source of the vehicle 1 at the time of power running. The MG 12 imparts the motor torque generated by power running driving to the engine 11. In contrast, the MG 12 also operates as a power generator by regenerative driving. A driving state of the MG 12 is controlled by the inverter 19. Meanwhile, another device such as a starter motor may also be adopted as the starting device in addition to the MG 12.

The clutch 13 is formed of a friction engaging clutch device, for example. The clutch 13 transmits or blocks the engine torque between the output shaft 11*a* of the engine 11 and the drive wheel 16 by being engaged or disengaged. An engaged state and a disengaged state of the clutch 13 are switched according to operation of the clutch pedal 51 by a driver.

The stepped transmission 14 is a manual transmission which executes gear shift corresponding to a shift position of a shift lever according to operation of the shift lever (not illustrated) by the driver. Rotation of the engine 11 input to an input shaft of the stepped transmission 14 is transmitted to the drive wheel 16 through an output shaft after speed thereof is changed by the stepped transmission 14.

The hydraulic control device 17 controls inflow and outflow of hydraulic pressure to the clutch 13 according to a control signal input from the ECU 50. According to this, it is possible to switch between engagement and disengagement of the clutch 13 independently from the operation of the clutch pedal 51 by the driver. The auxiliary machine 18 is a pump for power steering, a compressor for an air conditioner and the like. The pulley 23 is provided on an input shaft of the auxiliary machine 18 so as to be integrally rotatable with the same. The input shaft of the auxiliary machine 18, the rotary shaft of the MG 12, and the output shaft 11*a* of the engine 11 are connected to one another through the pulleys 21, 22, and 23 and the transmission belt 24.

The high-voltage battery 31 is formed of a 48 V lithium ion battery, for example. The high-voltage battery 31 is connected to the inverter 19 to be used as a power source to supply motor driving power to the MG 12. In contrast, the high-voltage battery 31 is used as a capacitor which stores generated power when the MG 12 serves as the power generator.

The power converter 33 provided with a DC/DC converter is connected to the inverter 19 and the high-voltage battery 31 and is connected to the battery 32. The battery 32 formed of a 12 V zinc battery, for example, is used as a power source which supplies power to various electric parts mounted on the vehicle 1 and the load 34 being an electric device. The power converter 33 is configured to be able to lower voltage of the high-voltage battery 31 and voltage of the power generated by the MG 12 to charge the battery 32.

The engine speed sensor 40*a* as a speed detecting unit detects a rotational speed of the crankshaft (not illustrated) connected to the output shaft 11*a* of the engine 11 as the engine speed and supplies a signal according to the detected engine speed to the ECU 50. The crank angle sensor 40*b* as a crank angle measuring unit measures the crank angle of the crankshaft (not illustrated) of the engine 11 at least when the engine 11 stops and supplies a signal according to the measured crank angle to the ECU 50.

The clutch pedal sensor 41 as a clutch state detecting unit detects the operational amount of the clutch pedal 51 by the driver and supplies a signal according to the detected operational amount to the ECU 50. That is to say, the clutch pedal sensor 41 may detect whether the clutch 13 starts shifting from the disengagement (blocked state) to the engagement (transmitting state) when on/off of the clutch pedal 51 and the disengagement/engagement of the clutch 13 are linked. Meanwhile, it is also possible to adopt a clutch sensor capable of detecting a clutch position (position regarding engagement/disengagement) or clutch torque of the clutch 13 in place of the clutch pedal sensor 41 as the clutch state detecting unit.

The accelerator pedal sensor 42 as an accelerator state detecting unit detects a step operational amount of the accelerator pedal 52 by the driver and supplies a signal according to the detected operational amount to the ECU 50. The brake pedal sensor 43 as a brake state detecting unit detects a step operational amount of the brake pedal 53 by the driver and supplies a signal according to the detected operational amount to the ECU 50. Meanwhile, it is also possible to adopt a master cylinder pressure sensor in place of the brake pedal sensor 43 as the brake state detecting unit.

The ECU 50 physically is an electronic circuit mainly formed of a well-known microcomputer including a CPU (central processing unit), a RAM (random access memory), a ROM (read only memory), and an input/output interface. Functions of the ECU 50 are realized by loading an application program held in the ROM as a recording unit on the RAM as a storage unit to be executed by the CPU, thereby allowing a control target to operate under control of the CPU and reading/writing data from/in the RAM and ROM.

The ECU 50 detects an operational state of the engine 11 based on detection results of various sensors including the above-described sensors and controls a fuel injection amount and injection timing by an injector and ignition timing by an ignition plug. The ECU 50 may execute control to increase the engine speed by increasing opening of an electronic control throttle regardless of the operation of the accelerator pedal 52 by the driver. Furthermore, the ECU 50 outputs the control signal to the hydraulic control device 17 based on the detection result of the clutch pedal sensor 41. The hydraulic control device 17 switches between the engagement and disengagement of the clutch 13 based on the control signal. Meanwhile, the ECU 50 may control the hydraulic control device 17 to control the disengagement and engagement of the clutch 13 regardless of the signal from the clutch pedal sensor 41 as needed.

The ECU 50 according to one embodiment performs control to select a method of restarting the engine 11 when an instruction of restarting request of the engine 11 is supplied to the ECU 50 while the vehicle 1 travels in a state in which the engine 11 is stopped. Specifically, the ECU 50 performs control to select the method of restarting the engine 11 according to the crank angle on the crankshaft of the engine 11.

Figure 2:
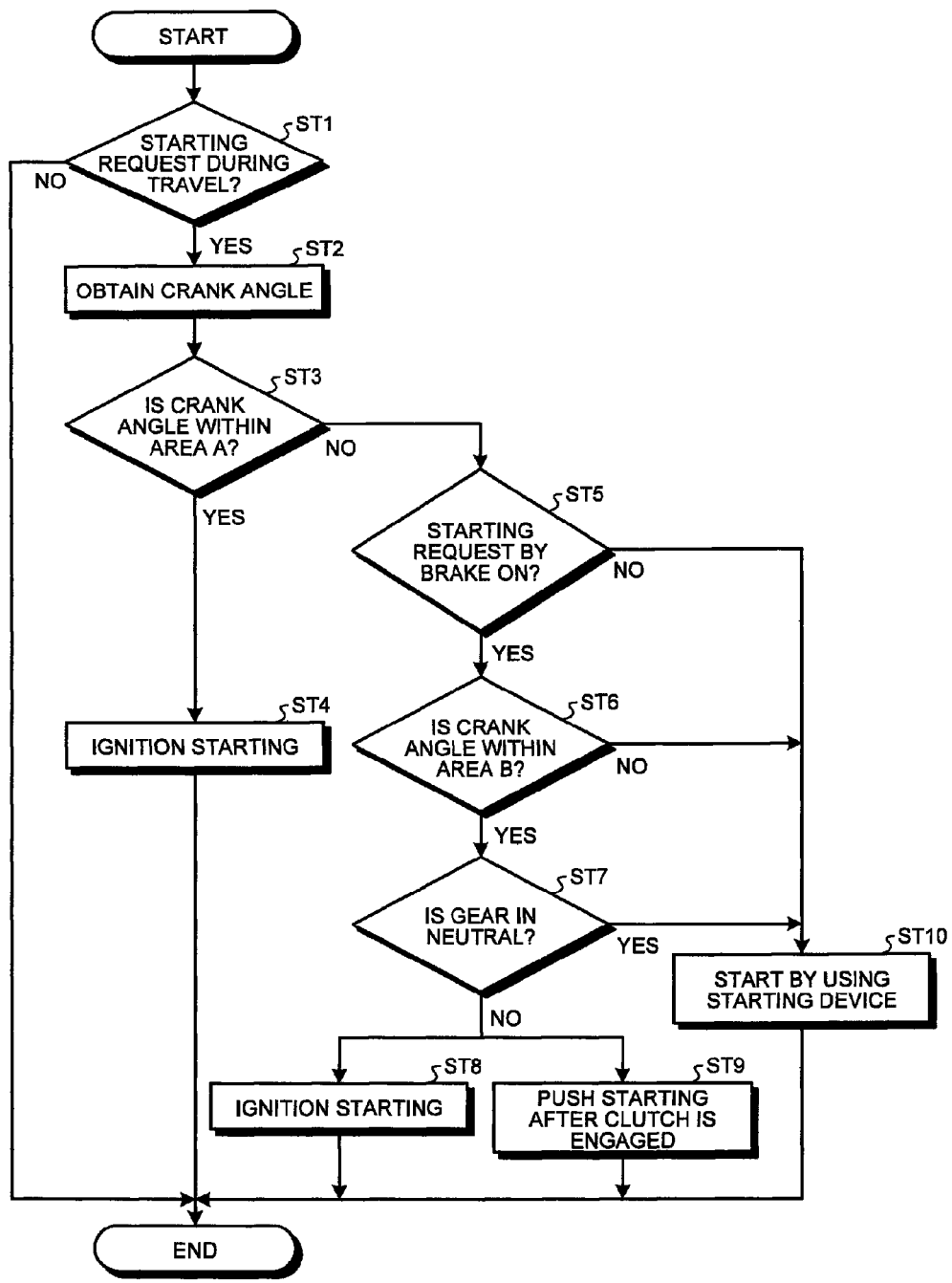
FIG. 2 is a flowchart for illustrating a control method by the vehicle control device according to one embodiment of the present disclosure.

A vehicle control method by the vehicle control device according to one embodiment of the present disclosure is next described. FIG. 2 is a flowchart for illustrating the vehicle control method. The flowchart illustrated in FIG. 2 described hereinafter is repeatedly executed at a predetermined time interval while the vehicle 1 travels in a state in which the engine 11 stops. Herein, assuming that the vehicle 1 is in free-running travel in a state in which the clutch 13 is automatically disengaged by the hydraulic control device 17 and the engine 11 is stopped by the control by the ECU 50.

The ECU 50 determines whether an instruction of starting request of the engine 11 is input while the vehicle 1 travels (step ST1). Herein, the instruction of the starting request of the engine 11 is a signal such as a detection signal of the accelerator pedal sensor 42 which detects a state in which the accelerator pedal 52 is stepped on and a detection signal of the brake pedal sensor 43 which detects a state in which the brake pedal 53 is stepped on.

When the instruction of starting request of the engine 11 is not supplied to the ECU 50 (No at step ST1), the flowchart finishes. On the other hand, when the instruction of the starting request of the engine 11 is supplied to the ECU 50 (Yes at step ST1), the ECU 50 obtains the crank angle on the crankshaft of the stopping engine 11 from the crank angle sensor 40b (step ST2).

Figure 3:
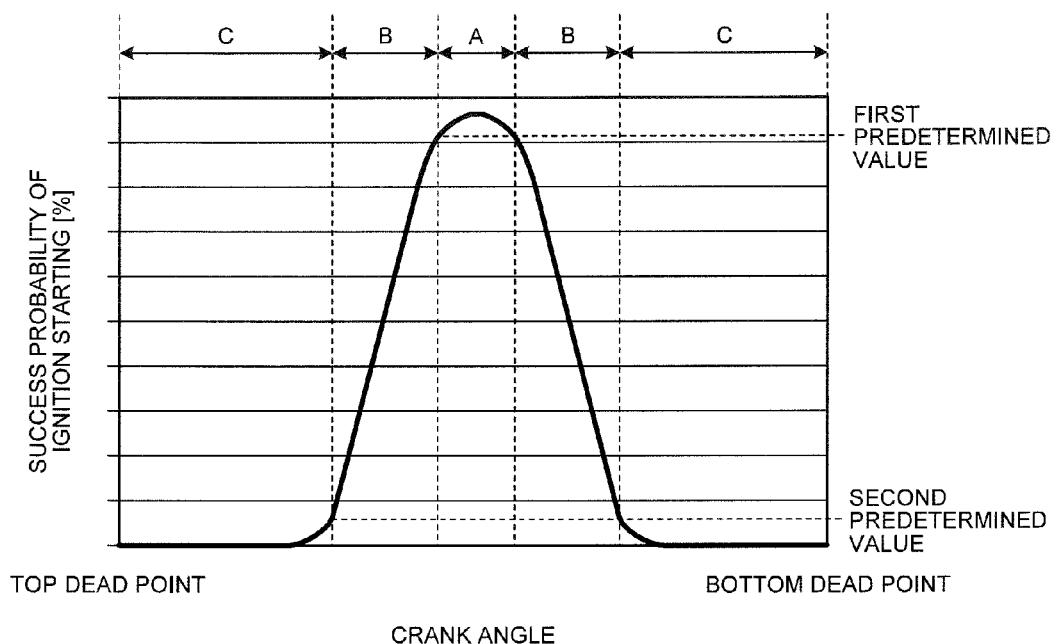
FIG. 3 is a graph illustrating crank angle dependency of success probability of ignition starting.

Subsequently, at steps ST3 to ST10, processes according to the obtained crank angle are performed. FIG. 3 is a graph illustrating an example of crank angle dependency of probability of succeeding in ignition starting of the engine 11 of the vehicle 1. Meanwhile, data of the crank angle dependency of success probability of the ignition starting between a top dead point and a bottom dead point illustrated in FIG. 3 depends on a characteristic of the engine 11 of the vehicle 1, so that this is stored in the recording unit of the ECU 50 in advance as a data table. As illustrated in FIG. 3, when the ignition starting is executed on the engine 11, it is required keep the crank angle of the engine 11 within a certain range. Furthermore, the range includes a range of the crank angle in which the ignition starting is easy and a range of the crank angle in which the ignition starting is difficult.

In FIG. 3, an area A as a first area is the range of the crank angle in which the engine 11 starts with probability not smaller than a first predetermined value when control of the ignition starting is performed on the engine 11. An area B as a second area is an area adjacent to the area A on a side of a larger crank angle and a side of a smaller crank angle in which the success probability of the ignition starting when the control of the ignition starting is performed on the engine 11 is not smaller than a second predetermined value and smaller than the first predetermined value. Meanwhile, the second predetermined value is smaller than the first predetermined value. An area C as a third area is an area in which the success probability of the ignition starting of the engine 11 is smaller than the second predetermined value. In the range of the crank angle indicated by the area C, the ignition starting of the engine 11 is extremely difficult. Therefore, it is required to start the engine 11 by using the starting device such as the MG 12. Herein, the first predetermined value and the second predetermined value are probability values determined for each engine 11 mounted on the vehicle 1, the values set for each engine 11 in advance.

When the ECU 50 determines that the crank angle of the crankshaft of the engine 11 is within the area A at step ST3 (Yes at step ST3), the procedure shifts to step ST4. The ECU 50 performs the control of the ignition starting to inject fuel to a combustion chamber of the engine 11 in an expansion stroke in a state in which the rotation of the output shaft 11a of the engine 11 stops to ignite and rotate the output shaft 11a at step ST4. According to this, the engine 11 is restarted.

On the other hand, when the ECU 50 determines that the crank angle of the crankshaft of the engine 11 is not within the area A (No at step ST3), the procedure shifts to step ST5. The ECU 50 determines whether the starting request input at step ST1 is caused by step-on of the brake pedal 53 at step ST5. When the starting request input to the ECU 50 at step ST1 is an on signal from the brake pedal sensor 43 (Yes at step ST5), the procedure shifts to step ST6.

The ECU 50 determines whether the crank angle obtained at step ST2 is within the area B illustrated in FIG. 3 at step ST6. When the crank angle on the crankshaft of the engine 11 is within the area B (Yes at step ST6), the procedure shifts to step ST7.

The ECU 50 determines whether a gear is in neutral at step ST7. When the gear is not in neutral (No at step ST7), the ECU 50 performs the processes at steps ST8 and ST9 in parallel. That is to say, at step ST8, the ECU 50 performs the control of the ignition starting of the engine 11 as at step ST4. At the same time, the ECU 50 performs control of so-called push starting to automatically engage the clutch 13 by controlling the hydraulic control device 17, thereby transmitting rotary torque (power) transmitted from the drive wheel 16 to the engine 11 to increase the speed of the engine 11 at step ST9. According to this, the ECU 50 restarts the engine 11 by performing the control of the ignition starting while performing the control of the push starting on the engine 11.

On the other hand, when the on signal is not input from the brake pedal sensor 43 to the ECU 50 at step ST5 (No at step ST5), the procedure shifts to step ST10 described later. Specifically, when the instruction to restart the engine 11 supplied to the ECU 50 is the signal from the accelerator pedal sensor 42 which detects step-on of the accelerator pedal 52, the procedure shifts to step ST10. When the crank angle obtained by the ECU 50 is not within the area B illustrated in FIG. 3 at step ST6 (No at step ST6), the procedure shifts to step ST10 described later. That is to say, when the signal from the brake pedal sensor 43 is an off signal or when the crank angle is within the range of the above-described third area, the procedure shifts to step ST10. When the gear is in neutral at step ST7 (Yes at step ST7), the procedure shifts to step ST10 described later. Specifically, when the gear is in neutral, the push starting at step ST9 cannot be performed, so that the procedure shifts to step ST10. At step ST10, as in a conventional manner, the ECU 50 performs control to drive the starting device such as the MG 12 to restart the engine 11.

From above, when the restarting request of the engine 11 is issued while the vehicle 1 travels in a state in which the engine 11 stops, the ECU 50 controls the restart of the engine 11 by selecting one type of method from three types of methods as the method of restarting the engine 11 according to the crank angle.

According to one embodiment of the present disclosure described above, when the engine 11 is restarted during the travel, when the crank angle is within the area A, the ignition starting is performed, and when the crank angle is within the area B adjacent to the area A and when the on signal is supplied from the brake pedal sensor 43 to the ECU 50, the ignition starting and push starting are performed together. According to this, it is possible to decrease frequency of restarting the engine 11 by the starting device such as the MG 12 and the starter motor. Especially, when the crank angle is highly likely to be kept within the area A in a state in which the engine 11 stops, usage frequency of the starting device such as the MG 12 and the starter motor may be considerably decreased. Therefore, it is possible to inhibit a lifetime of the starting device from being short and inhibit deterioration in motor forming the starting device and abrasion of a pinion gear and a drive plate.

Furthermore, when the crank angle is within the area B and the brake pedal 53 is stepped on, it is possible to restart the engine 11 with high probability because the ignition starting and push starting are performed together. When the ignition starting and push starting are performed together, brake force acts on the vehicle 1, so that it is possible to inhibit a sense of discomfort (feeling to be drawn) due to drop in acceleration (deceleration G) felt by the driver in normal push starting, thereby inhibiting deterioration in drivability.

Although one embodiment of the present disclosure is hereinafter specifically described, the present disclosure is not limited to the above-described one embodiment and various modifications based on the technical thought of the present disclosure may be made. For example, the numeric values in the above-described one embodiment are illustrative only and different numeric values may also be used as needed.

The example in which the signals such as the detection signal of the accelerator pedal sensor 42 and the detection signal of the brake pedal sensor 43 are adopted as the instruction of the starting request of the engine 11 is described in the above-described one embodiment, this is not necessarily limited to the example. Specifically, a detection signal of a sensor provided on a hydraulic circuit and a brake caliper (not illustrated) forming a braking unit together with the brake pedal 53 may also be adopted, and various signals which might serve as the starting request of the engine 11 may be adopted as the instruction of the starting request.

Although a three pedal-type manual transmission (MT) vehicle provided with the clutch 13 and the clutch pedal 51 is described as the vehicle 1 in the above-described one embodiment, the vehicle is not necessarily limited to the MT vehicle. That is to say, it is also possible to adopt a vehicle without the clutch pedal such as an automatic transmission (AMT) vehicle as the vehicle to which the present disclosure is applied. Although the MG 12 and the inverter 19 are separately formed in the above-described one embodiment, the MG 12 and the inverter 19 may also be integrally formed.

According to the vehicle control device, it is possible to increase frequency of restarting the engine without using the starting device for starting the engine and to decrease frequency of starting the engine by the starting device, so that a load on the starting device may be decreased.

Furthermore, when the probability of the ignition starting is relatively low and when a brake is put on the vehicle, the push starting may be performed together, so that probability of restarting the engine is increased, and the push starting may be performed in a state in which a brake is put on the vehicle based on operation of the driver and the deceleration occurs, so that possibility that the driver feels uncomfortable, for example, feels to be drawn may be decreased and the deterioration in drivability may be avoided.

According to the disclosure, the torque of the drive wheel may be transmitted to the engine through the crankshaft even in the second area in which probability of succeeding in starting the engine only by the ignition starting is relatively low, so that it is possible to increase success probability of the ignition starting. Therefore, it is possible to increase frequency of restarting the engine without using the starting device for starting the engine, so that frequency of starting the engine by the starting device may be decreased. Furthermore, when the instruction to restart the engine is based on the on signal of the braking unit, the ignition starting and push starting may be performed together. When the instruction for restarting the engine is output based on the signal indicating that the braking unit is turned on, the push starting is executed in a state in which deceleration occurs on the vehicle in association with braking force, so that deceleration occurring when the push starting is executed may be lost among the deceleration occurring in association with the braking force. According to this, a sense of discomfort of the driver caused by the deceleration due to the push starting may be minimized, so that deterioration in drivability may be inhibited.

According to the disclosure, when probability of starting the engine by the ignition starting is relatively low and when the braking unit is turned off, the engine may be restarted without the push starting. Therefore, the deceleration of the vehicle in association with the execution of the push starting does not occur and the engine may be restarted as in a conventional manner, so that the deterioration in drivability may be prevented.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle control device adapted for controlling a vehicle including: an engine; a starting device capable of starting the engine; a clutch which connects or blocks a power transmission path between the engine and a drive wheel by being engaged or disengaged; a transmission capable of outputting driving force input from the engine after changing a speed; a crank angle measuring unit which detects a crank angle on a crankshaft of the engine when the engine stops; and a braking unit which puts a brake on the vehicle, wherein the vehicle is configured to continuously travel in a state in which the clutch is disengaged and the engine is stopped, the vehicle control device comprising:

a controller to which the crank angle detected by the crank angle measuring unit is input when an instruction to restart the engine is input during travel with the clutch disengaged and the engine stopped, the controller being configured to perform:

ignition starting of the engine when the crank angle is within a first area in which the ignition starting of the engine may be performed with probability not smaller than a first predetermined value; and the ignition starting of the engine while increasing an engine speed by engaging the clutch to transmit torque of the drive wheel to the crankshaft when the crank angle is within a second area in which the ignition starting of the engine may be performed with probability not smaller than a second predetermined value smaller than the first predetermined value and smaller than the first predetermined value, the instruction is output based on a signal indicating that the braking unit is turned on, and a gear of the transmission is not in neutral.

2. The vehicle control device according to claim 1, wherein the control unit restarts the engine by the starting device when the crank angle is within the second area and the instruction is not based on the signal indicating that the braking unit is turned on.

* * * * *